(No Model.) 6 Sheets—Sheet 2.

F. S. BRADLEY & J. P. LAVIGNE.
STAPLE STITCHING MACHINE.

No. 438,399. Patented Oct. 14, 1890.

(No Model.) 6 Sheets—Sheet 3.

F. S. BRADLEY & J. P. LAVIGNE.
STAPLE STITCHING MACHINE.

No. 438,399. Patented Oct. 14, 1890.

(No Model.) 6 Sheets—Sheet 4.

F. S. BRADLEY & J. P. LAVIGNE.
STAPLE STITCHING MACHINE.

No. 438,399. Patented Oct. 14, 1890.

(No Model.) 6 Sheets—Sheet 5.

F. S. BRADLEY & J. P. LAVIGNE.
STAPLE STITCHING MACHINE.

No. 438,399. Patented Oct. 14, 1890.

(No Model.) 6 Sheets—Sheet 6.

F. S. BRADLEY & J. P. LAVIGNE.
STAPLE STITCHING MACHINE.

No. 438,399. Patented Oct. 14, 1890.

UNITED STATES PATENT OFFICE.

FRANK S. BRADLEY AND JOSEPH P. LAVIGNE, OF NEW HAVEN, CONNECTICUT.

STAPLE-STITCHING MACHINE.

SPECIFICATION forming part of Letters Patent No. 438,399, dated October 14, 1890.

Application filed January 27, 1890. Serial No. 338,273. (No model.)

*To all whom it may concern:*

Be it known that we, FRANK S. BRADLEY and JOSEPH P. LAVIGNE, of New Haven, in the county of New Haven and State of Connecticut, have invented new Improvements in Staple-Stitching Machines; and we do hereby declare the following, when taken in connection with accompanying drawings and the letters of reference marked thereon, to be a full, clear, and exact description of the same, and which said drawings constitute part of this specification, and represent, in—

Fig. 12, a detached view showing the connection between the former of the flat-wire side of the machine and the rocking arm which actuates the cutter of the cutting-off mechanism, the former being shown in horizontal section and the rocking arm in place; Fig. 13$^a$, a detached view, in rear elevation, of the anvil; Fig. 29 is a sectional view of the lower end of the cutter-box, showing the die mounted therein and the bent finger entering the slot in the die.

Our invention relates to an improvement in staple-stitching machines, the objects being to provide in one machine mechanisms for flat-wire stitching and for round-wire stitching without the removal or interchange of any parts, to adapt the table of the round-wire side of the machine to be converted for flat stitching or for saddle-stitching, to secure economy of room, to provide for the use of the machine by two persons at the same time, to provide in one machine for stitching pamphlets of few leaves and books of as many leaves as are ever stitched by adapting it to be adjusted thereto, and to secure simplicity of construction, ease of operation and adjustment, with reliability and durability in use.

With these ends in view our invention consists in certain details of construction and combinations of parts, as will be hereinafter described, and pointed out in the claims.

As herein shown, the mechanisms of our improved machine are mounted in a frame or standard, consisting of an upright hollow post A, provided at its lower end with a foot B, two hollow arms C C, respectively extending outward in opposite directions from the post and curved upward, an open frame-head D, secured to the upper end of the post and having bearings for the two shafts E E' of the machine, and two cases F F'. This frame or standard provides, as is apparent, for a double machine, the two sides of which are entirely independent of each other, so that they may be independently operated, their arrangement also permitting them to be operated at the same time, so that two persons may, without interfering with each other, work at the machine, whereby its capacity is made very large.

The mechanisms of the two sides of the machine are exactly alike, except for differences in the two tables, as will be mentioned later on, and for the further difference that the devices on one side of the machine are adapted to work flat wire and on the other side of the machine round wire, the wire-receiving grooves in the one case being round and in the other case having flat sides. For convenience in distinguishing between the two sides of the machine, we shall hereinafter refer to them, respectively, as the "flat-wire" and the "round-wire" sides thereof. Inasmuch as these two mechanisms are alike, except in their immaterial difference of being adapted to handle round wire or flat wire, it will be sufficient in describing the machine to describe one side only, for such a description will accurately describe the other side also. With the understanding then that all of the parts described are duplicated on the other side of the machine, we will proceed in the description of the flat-wire side of the machine, beginning with the wire-straightening devices and taking the wire along as it is fed, cut off, formed into a staple, driven through the leaves of the pamphlet or book, and clinched.

The wire G is coiled upon a spool H, removably mounted upon a spool-holder I, which is attached to the outer end of a horizontal arm J, offsetting from the lower end of the case F of the machine. The spool is provided with the usual tension-spring K and adjusting thumb-nut L. From the spool the wire is entered into a horizontal opening M, extending transversely through a frame N, which is secured to the outer end of the arm J aforesaid. This frame has also formed in it a longitudinal bore O, entering it from its lower end and intersecting the eye or opening M aforesaid at a right angle, and itself intersected by an opening P, entering the block from the outer face thereof. The intersection of the opening M by the bore O and the opening P frees the wire between the opposite ends of the opening M and permits it to be acted upon in being straightened by a small cylindrical straightening-block Q, located in the bore O and provided with a longitudinal slot R, through which the wire passes, and with a slot S, receiving a pin T, mounted in the frame N and holding the straightening-block in right position and permitting it to be adjusted longitudinally accordingly as may be necessary by the character of the wire to be straightened. A small spiral spring U, located above the said pin T and in the extreme upper end of the bore O, engages with the upper end of the cylindrical straightening-block Q and exerts a constant tendency to press it downward, and thus relieve the wire, the block being held up in position to straighten the wire by means of a set-screw V, entering the lower end of the bore O and provided at its outer end with a graduated and knurled head W, which is operated in connection with a zero-mark (see Fig. 3) on the frame N to determine the position of the straightening-block, and hence its straightening action. The object of making the provision just described for gaging the position of the adjusting-screw and hence that of the straightening-block is so that the latter may be relieved or allowed to drop down for threading a new length of wire through it, and then set back to obtain exactly the same straightening action as was found desirable to use with a previous coil of wire. After leaving in straight form the inner end of the opening M the wire is passed between a feed-roller X and a guide-block Y, both of the said parts being carried by a reciprocating feed-block Z, located in the arm J, which is thereto provided with a horizontal longitudinal chamber $a$. This block is connected with the lower end of a feed-lever $b$, hung at its upper end upon a pivot $c$, mounted in an arm $d$, offsetting from the case F, the said arm being provided with a long and slightly-curved slot $e$, receiving a pin $f$, mounted in the bent outer end of an eccentric-strap $g$, the inner end whereof encircles an eccentric $h$, rigidly secured to the main shaft E of this side of the machine. The outer end of the strap $g$ is secured to the feed-lever $b$ at any point within the length of the slot $e$ thereof by means of a knurled thumb-nut $g'$, mounted upon the outer end of the pin $f$, and operating to clamp the feed-lever between it and the said end of the strap, the throw of the lever, and hence the throw of the reciprocating feed-block, being dependent upon the point where the strap is connected with the feed-lever. A graduated scale engraved upon the feed-lever along the length of the slot $e$ is provided for gaging the throw of the lever, and hence the length of wire fed and the length of the staple ends to the thickness of the work to be stitched.

The periphery of the feed-wheel X is provided with fine teeth made so as to readily take hold of or bite into the wire. This wheel is mounted so as to rotate freely in the lower end of a pivotal frame $i$, which incloses it on both sides, the upper end of the said frame being hung from a screw-stud $j$, entering the outer face of the reciprocating feed-block Z. A check-cam $k$, pivotally hung on the said stud $j$ and between the upper ends of the pivotal frame $i$, is provided at its lower end with fine teeth arranged to engage, when the said cam is in its normal position, with the teeth formed in the periphery of the feed-wheel. The said cam is provided with a counter-weight $l$, and with a spring $m$, the said counter-weight and spring operating to hold it in its normal position, and the spring further operating to sustain it in its retired position, in which it is shown by broken lines in Fig. 6 of the drawings.

Figures 3, 4, 5, 6, 7, 8, 9, 10, 11, 16:
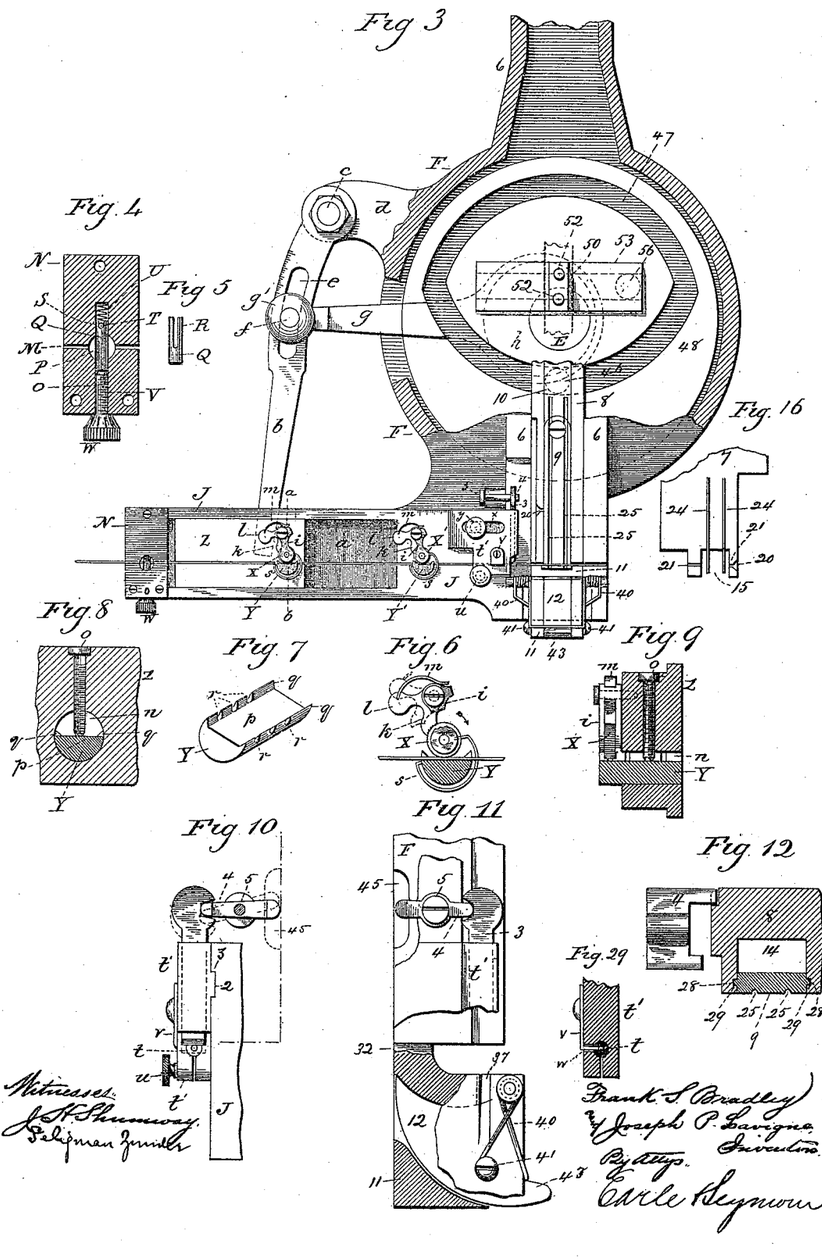
Fig. 3, an enlarged broken view, partly in elevation and partly in section, and showing the wire-straightening, the wire-feeding, and the staple-forming and staple-driving mechanisms of the flat-wire side of the machine.
Fig. 4, an enlarged detached view, in vertical longitudinal section, of the wire-straightening mechanism of the machine.
Fig. 5, a detached view, in side elevation, of the straightening-block of the said wire-straightening mechanism.
Fig. 6, a detached enlarged view of the feeding elements proper of the feeding mechanism.
Fig. 7, a detached enlarged perspective view of one of the guide-blocks of the feeding mechanism.
Fig. 8, a detached enlarged sectional view showing the mode of securing the guide-block mounted in the reciprocating feed-block in place therein.
Fig. 9, a view, partly in side elevation and partly in vertical transverse section, on the line $a\,b$ of Fig. 3 and showing the said reciprocating feed-block and the feeding elements proper of the feeding mechanism.
Fig. 10, an enlarged view, in inside elevation, of the cutting-off mechanism for cutting the wire into staple-lengths, the lower end of the former being shown by broken lines.
Fig. 11, a view of the same parts in outside elevation, including a view of the presser-foot and the pivotal supporting-block mounted thereon.
Fig. 16, a broken view, in rear elevation, showing the lower end of the face-plate, to which the anvil is attached, and which closes in the staple-forming and staple-driving mechanism of the machine.

The guide-block Y projects endwise from a horizontal opening $n$, (see Figs. 8 and 9,) entering the reciprocating feed-block Z from the outer face thereof, and is held in place therein by a screw $o$, mounted in the feed-block, as shown by Fig. 8 of the drawings. The guide-block is provided with a longitudinal groove $p$, into which the feed-wheel X enters, the grooving of the block, as described, forming two beveled walls $q\ q$, which are transversely slotted in three places, as at $r$, to form guide-ways for the wire, which is supported upon the floor of the groove $p$. The object in slotting the guide-block in more than one place is to permit it to be shifted, so as to bring a new guideway into place when one has been worn. By providing the block with three pairs of slots it may be used in three different positions before it is discarded for another. The said feed-wheel Z is pressed down upon the wire by means of a small spring $s$, engaged with the lower end of the frame $i$ and with the guide-block Y; but it is obvious that this spring may be constructed and arranged in a variety of other ways. The said feed-wheel X, the check-cam $k$, and the guide-block Y together form the feeding elements of the feeding mechanism, because they take hold of the wire and feed it forward. The parts just mentioned are exactly duplicated in a check-wheel X′, cam $k'$, and guide-block Y′, located near the inner end of the horizontal arm J and secured thereto, being therefore stationary, while the corresponding parts above described at length are moved with the reciprocating feed-block. The said stationary parts of the feeding mechanism operate to grip the wire and prevent it from being pulled backward when the feed-block makes its outstroke, and therefore constitute the checking elements of the feeding mechanism. It will be noticed that the centers of both of the said wheels are normally in advance of the screw-studs on which their pivotal frames are hung, and that while the check-cams will permit the wheels to rotate freely in one direction they will immediately lock them against rotation in the opposite direction.

Under the above-described construction, when the feed-block begins its instroke, the feed-wheel X, being frictionally engaged with the wire by the spring $s$, will tend naturally to rotate in the direction of the arrow seen in Fig. 6 of the drawings. The check-cam $h$ will not, however, permit the wheel to rotate in the direction indicated, but locks it against rotation. The outward pull of the wire under the influence of inertia and friction meanwhile operates to drag the wheel back, moving it outward and downward, so that it firmly punches the wire between it and the guide-block Y. Now as the feed-block is moved forward the wire will be unwound and fed. As the wire passes under the check-wheel X′ the same is rotated in the opposite direction from that above indicated for the wheel X, and therefore away from its check-cam, which rides over it while the wheel rotates freely over the wire in contact therewith, but not appreciably retarding the same, the check-wheel and its pivotal frame being now thrown slightly inward and lifted by the pushing of the wire against its outer edge. When, on the other hand, the feed-block begins its outstroke, the operation above described will be reversed, the check-wheel being locked by its cam and dragged down and outward so as to firmly pinch the wire and prevent the same from being pulled back and the feed-wheel being freely rotated under its check-cam, which trips over it. It will thus be seen that when the teeth of the said wheels are not gripping the wire for feeding or checking it the wheels roll lightly over the wire, so that their teeth do not wear, but retain their edges for gripping the wire, insuring a positive and reliable feeding action for the machine, whereas the feeding mechanisms used in prior machines of this class are subject to wear, and must frequently be sharpened or replaced or they fail to feed.

The wire is fed from the inner stationary guide-block Y' into a horizontal cylindrical longitudinally-slotted die $t$, mounted in the lower end of a cutter-box $t'$, the lower end of which is longitudinally bored out and vertically slotted to receive said die and provided with a set-screw $u$ for clamping the same in place. A bent finger $v$, secured by a screw to the outer face of the cutter-box, enters a slot $w$ formed therein, and extends into the slot of the die and prevents the same from turning in the box, and also compels the wire to run in the bottom of the die-slot. The upper end of the cutter-box is provided with a horizontal slot $x$, receiving a clamping thumb-screw $y$, which enters the inner end of the arm J and secures the cutter-box thereto, the said box being horizontally adjustable within the limits of the said slot and being gaged in its adjustment by a graduated scale engraved upon the adjacent outer surface of the said arm J. A horizontal rib $z$, formed upon the inner face of the cutter-box, enters a corresponding horizontal slot 2, formed in the face of the arm J, and prevents the said box from turning on the screw $y$. A vertical slot formed in the extreme inner edge of the cutter-box receives a long narrow shearing-cutter 3, which co-operates with the inner end of the die, before mentioned, the upper end of this cutter being enlarged and slotted for engagement with the adjacent cog-like end of a rocking arm 4, mounted upon a horizontal screw-stud 5, entering the case F. The said end of the rocking arm is made of sufficient length to permit the cutter to be adjusted over it in shifting the position of the cutter-box. The actuation of the rocking arm for operating the cutter will be explained at another time.

Figure 13:
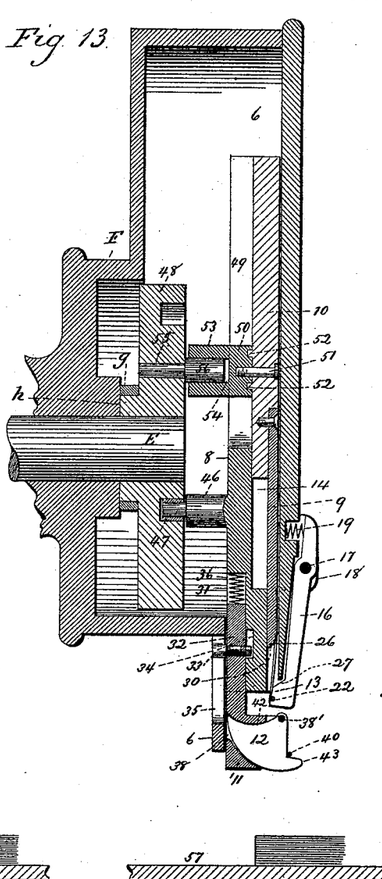
Fig. 13, an enlarged view, in vertical section, on the line $c\,d$ of Fig. 2, of the staple-forming and the staple-driving mechanism, showing the former and the presser-foot in their positions of separation to give clearance to the ends of the wire in forming a staple.
Figure 13A:
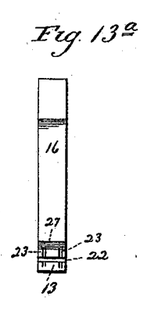
Figure 14:
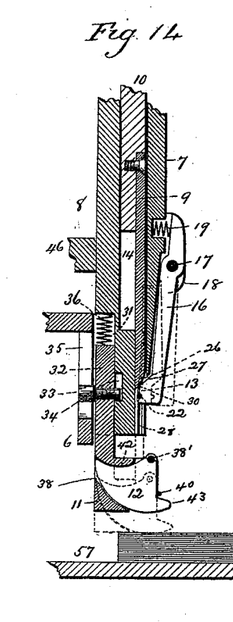
Fig. 14, a sectional view corresponding in part to Fig. 13, but showing the former, the presser-foot, and the driver in position for the latter to descend and push away the anvil and form the staple.
Figure 15:
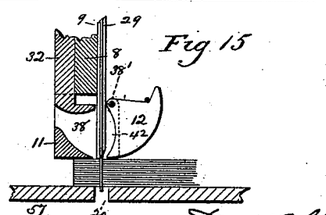
Fig. 15, a view showing the retirement of the pivotal supporting-block by the driver.

From the cutting-off mechanism just above described the wire is fed to the staple-forming and staple-driving mechanism. This is contained in great part in a hollow vertical extension 6 of the case F, the said extension being closed in by a face-plate 7. The said mechanism consists of a former 8, a driver 9, a driving-bar 10, to the lower end of which the said driver is attached, a presser-foot 11, connected with the lower end of the former 8, and so as to be moved relatively thereto, a pivotal supporting-block 12, mounted in the presser-foot, an anvil 13, and some minor features, to be mentioned later on. The said driving-bar and driver are located in a groove 14, located in the outer face of the former and extending throughout the length thereof. The said anvil 13 projects inward into the vertical extension 6 of the case F through an opening 15 (see Fig. 16) formed in the extreme lower end of the face-plate 7, and is itself formed at the lower end of an arm 16, hung at its upper end on a pin 17, extending between two ears 18, projecting from the outer face of the said plate. A spiral spring interposed between the face-plate and the extreme upper ends of the arms 16 exerts a constant effort to throw the anvil under the driver, to which it presents the staple-lengths of wire for forming into staples. From the cutting-off mechanism the wire is fed into a conical centering-recess 20, (see Figs. 3 and 16,) half of which is formed in the former and half in the face-plate, the former being timed in its vertical reciprocations, so that when the wire is fed it will register its half of the said conical centering-recess with the other half thereof in the face-plate, which is stationary. From the said centering-recess the wire enters the outer end of a horizontal groove 21, (see Fig. 16,) formed exclusively in the inner face of the face-plate, and thence into a corresponding groove 22, formed in the anvil, (see Fig. 13$^a$,) the two grooves just mentioned being in line with each other and the anvil intersecting the groove in the face-plate. The inner face of the anvil is also provided with two parallel vertical grooves 23 23, which respectively receive the free lower ends of two wires 24 24, (see Fig. 16,) secured to the inner face of the face-plate and accommodated in two long parallel grooves 25 25, formed in the outer face of the driver 8 and extending upward into the lower end of the driving-bar 10. It may be remarked here that the driver and driving-bar are made independently and attached to each other for convenience of manufacture, the driver itself having to be of hardened steel. The function of the two wires just mentioned is to hold the blank of staple-wire in the grooves in the anvil and face-plate, when, in the operation of the machine, the driver is lifted above the anvil, at which time the anvil is thrown inward under the driver by the action of the spiral spring 19. The lower end of the driver is provided with a bevel 26, which co-operates with a bevel 27 of opposite inclination, formed upon the anvil to force the anvil outward against the tension of the spring 19, and thus permit the driver to pass below the anvil in driving a staple. Two long forming-grooves 28 28, slightly enlarged and flaring at their lower ends, are respectively located on opposite sides of the slot formed in the former to receive the driver and driving-bar. These long grooves receive ribs 29 29, formed on the opposite edges of the driving-bar and provided for covering the whole length of the crown of the staple which is formed in the said groove. The lower end of the said driver is provided with a shoulder 30, adapted to receive the crown of a staple, which is engaged by the said shoulder when the driver descends.

The rear face of the lower end of the former is provided with a vertical slot 31 to receive the arm 32 of the presser-foot, the said arm and former being coupled together by means of a set-screw 33, located in the arm and entering an elongated slot 34, formed in the former 8, the relative movement of the former and presser-foot being determined by the length of the said slot. The head of the said screw 33 enters a slot 35, formed in the lower end of the extension 6 of the frame F, and stops the descent of the presser-foot for closing the clearance-space normally existing between it and the lower end of the former, which comes down to close the said space after the foot has been arrested by the engagement with the head of the said screw with the lower end of the slot. A spiral spring 36, interposed between the upper end of the slot 31 and the upper end of the arm 32 of the presser-foot, is provided for normally separating the presser-foot and holder, so as to form an opening between their adjacent ends, this opening being temporarily closed during the operation of the machine, as will be hereinafter described.

Figure 17:
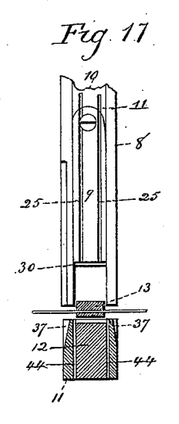
Fig. 17, a detached broken view, in partly front elevation and partly in section, showing the former, the driver, the presser-foot, the pivotal supporting-block, and the anvil, the latter being shown with a staple-length of wire in it.
Figure 18:
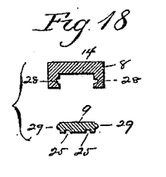
Fig. 18, a detached view of the former and the driver in transverse section, and showing the forming-grooves in the former and the corresponding ribs on the driver.
Figure 19:
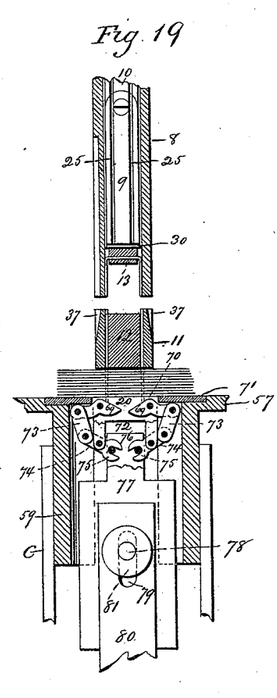
Fig. 19, a detached broken view showing the stitching-table and staple-clinching mechanism, together with a book, a staple, and features of the staple-forming and staple-driving devices, the parts being shown in the positions which they occupy when the staple has been driven.
Figure 20:
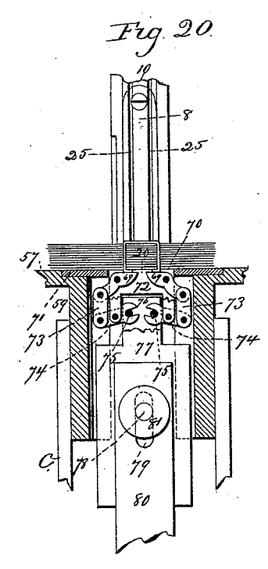
Fig. 20, a similar view showing the positions of the parts after the staple has been driven and clinched.
Figure 21:
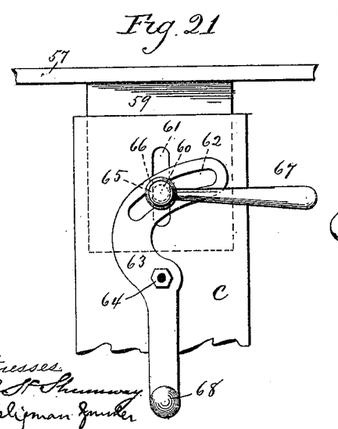
Fig. 21, a detached broken view, in rear elevation, showing the mechanism for adjusting the stitching-table.
Figure 22:
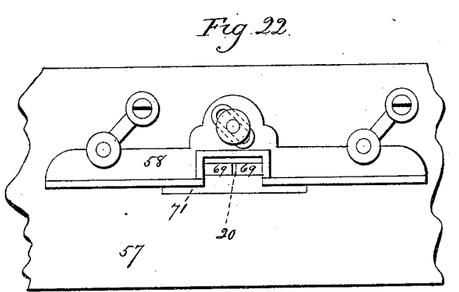
Fig. 22 is a broken plan view of the flat stitching-table and showing the gage thereon.
Figure 23:
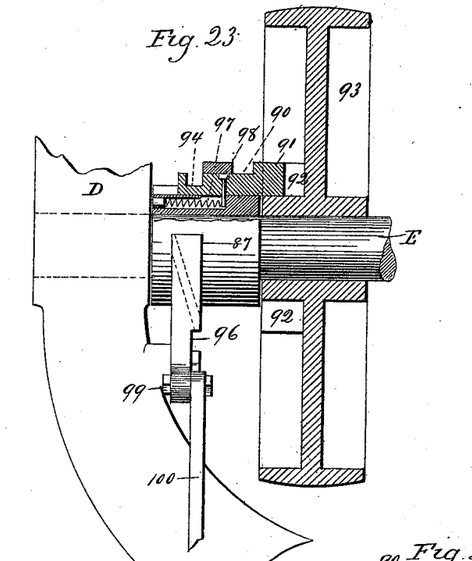
Fig. 23, an enlarged view, in vertical central section, showing the combined clutch and cam, which operates in its clutching function to stop and start the staple-forming and staple-driving mechanism and in its cam function to actuate the staple-clinching mechanism.
Figure 24:
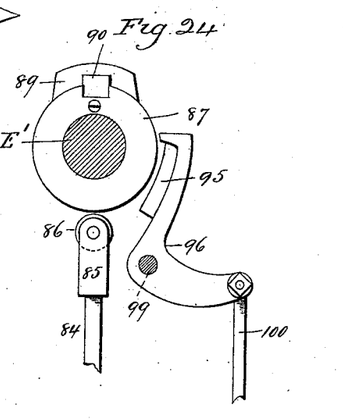
Fig. 24, a detail view of the said combined clutch and cam, together with the clutch-lever and the actuating-rod of the staple-clinching mechanism.
Figures 25, 26:
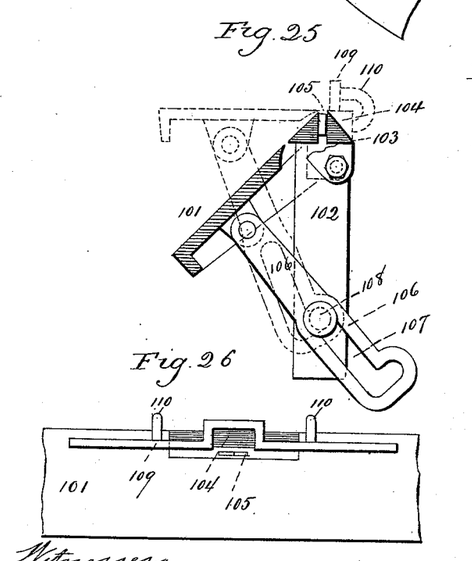
Fig. 25, a view, partly in section and partly in end elevation, of our improved convertible table for flat stitching and for saddle-stitching.
Fig. 26, a detached plan view of the said table and gage.

The presser-foot is provided near its forward edge and upon its opposite sides with two vertical clearance-slots 37 37, which receive and clear the ends of the staple-wire when the same is being folded up, and with a central longitudinal chamber 38 to receive the pivotal supporting-block 12, which is hung on a horizontal pivot 38', mounted in the forward upper edge of the presser-foot and extended at its ends to receive the coils of a stiff spring 40, attached to screws 41 41, mounted in the foot, this spring being sufficiently stiff to hold the curved operating-surface 42 of the block against the crown of the staple engaged with the shoulder of the driver with the force required to hold the staple firmly in that position. A lug or finger 43, formed on the outer edge of the supporting-block, is provided for the engagement of the block by the spring. The outer or forward end of the chamber 38, formed in the presser-foot, extends from the upper to the lower end thereof and constitutes a passage-way for the driver. Two driving-grooves 44 44, (see Fig. 17,) respectively formed in the opposite walls of the said passage-way portion of the chamber, virtually constitute extensions of the forming-grooves 28 28 formed in the former, and receive the ends of the staples and the extreme ends of the crowns thereof. A groove 45, located in one side of the former, (see Fig. 11,) receives the inner end of the rocking arm 4, which is thereto extended through an opening in the vertical extension 6 of the case F. This connection between the former and the rocking arm provides for the actuation of the shearing-cutter 3 of the cutting-off mechanism already described.

Figure 1:
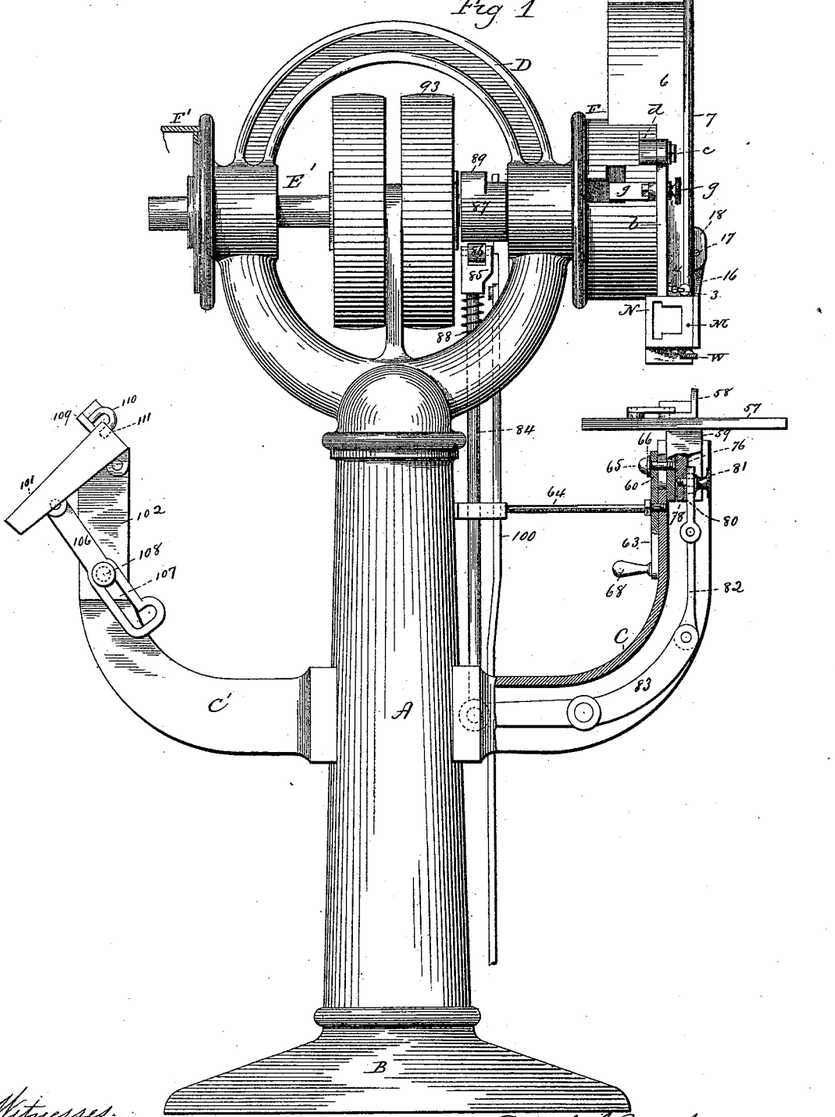
Figure 1, a view, partly in side elevation and partly in vertical section, of a machine embodying our invention, the mechanism for straightening and feeding round wire and forming it into staples and driving the same not being shown, as they duplicate the mechanism for handling flat wire.
Figure 2:
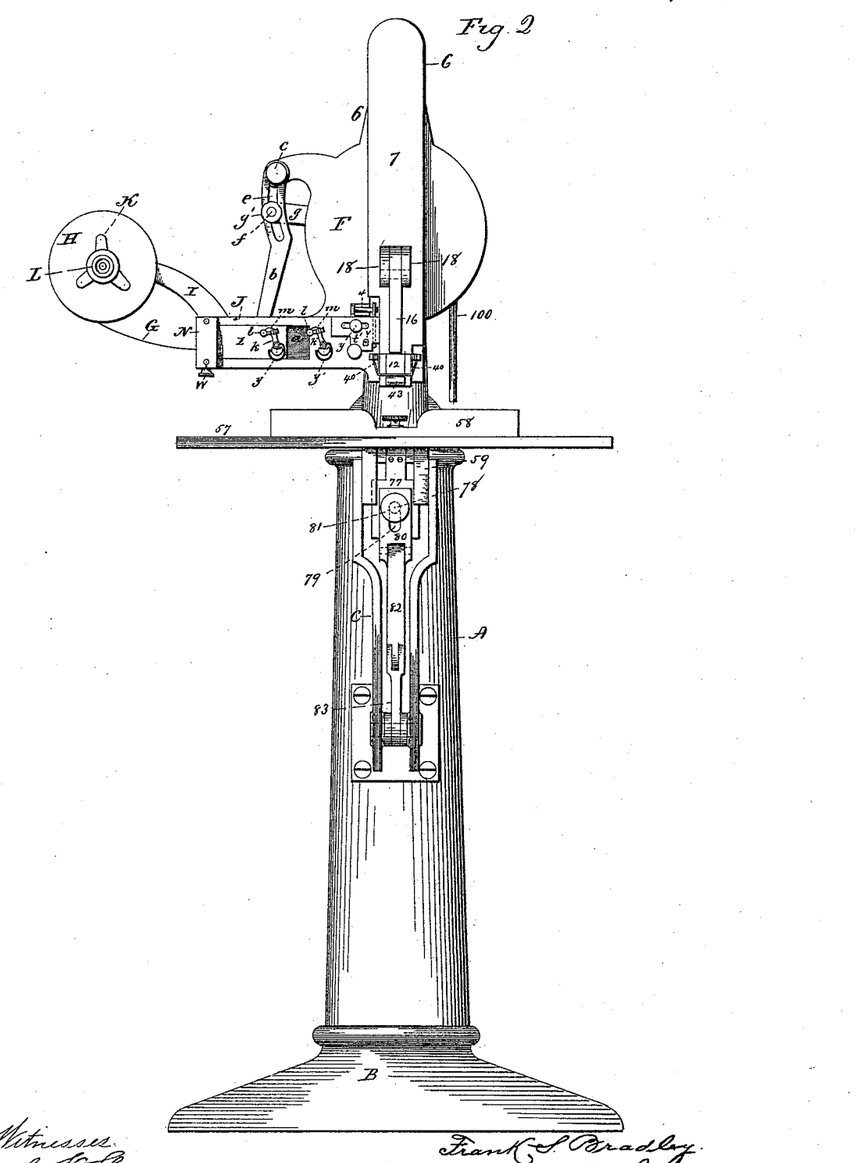
Fig. 2, a view of the machine in end elevation, looking toward its flat-wire side.

The former is itself provided upon its rear face with a pin 46, carrying an anti-friction roller entering a cam groove 47, formed in the outer face of a disk 48, mounted upon the outer end of the shaft E of the flat-wire side of the machine, the said cam-groove and pin being provided for the vertical reciprocation of the former. The upper end of the former is cut away, as at 49, to receive and provide for the vertical movement of a block 50, to which the driving-bar 10 is secured by means of a set-screw 51 and two pins 52 52 entering suitable counter bores formed in the said block, on opposite sides of the opening provided therein to receive the said screw. The said block forms a forward extension of a horizontal bar 53, having its inner face provided with a longitudinal horizontal slot 54, receiving a pin 55, encircled by an anti-friction roller 56, and mounted in the said disk before mentioned in a position eccentric to the center thereof, the said pin, horizontal bar, and block providing for the vertical reciprocation of the driver independently of the reciprocation of the former. This side of the machine is provided with a flat stitching-table 57, having a gage 58 of known construction mounted upon it. The table 57 is provided on its under face with a hollow post 59, fitted to be vertically moved in the upper end of the adjacent curved hollow arm C of the frame of the machine. This post is provided upon its rear face with the stud 60, (see Fig. 1,) having its outer end shouldered and provided with a threaded nipple, the said stud passing through a vertically-elongated slot 61, formed in the upper end of the arm, and into a cam-slot 62, formed in the upper end of an adjusting-lever 63, mounted on the outer end of a horizontal stay-rod 64, which connects the said arm with the upright hollow post A' of the machine. The said stay is a desirable adjunct of the frame, in view of the great strain imposed thereupon in doing this class of work, the tendency of the strain being to throw the arm outward and to carry the staple-clinching mechanism out of alignment with the staple-forming and staple-driving mechanism, which has just been described. A cap 65, screwed over the outer end of the nipple of the said stud, works against a washer 66, slipped over the same and bearing against the inner face of the upper end of the adjusting-lever, and clamps the said lever firmly to the arm. When it is desired to vertically adjust the table, the cap 65 is loosened by means of a handle 67 entered into it, and the table then raised or lowered by means of the handle 68 of the adjusting-lever 63, the cam-slot of which operates to adjust the table. After the table has been brought to the required adjustment the cap is tightened to clamp it to the arm again. In adjusting the table, as described, the operator is guided by a graduated scale, engraved upon the outer face of the hollow post before mentioned and corresponding to the graduations upon the feed-lever C and the arm J.

The staple-clinching mechanism of the machine consists, essentially, of two clinchers 69 69, having their upper ends located in an elongated slot 20, formed in a plate 71, set into the flat table 57, before referred to, and provided upon its lower face with an open frame 72, in which the said clinchers are hung at points about midway of their length. The outer ends of the said clinchers are connected by short links 73 73 with the outer ends of two operating-levers 74 74, mounted in the lower end of the said frame and having their inner ends provided with open slots receiving studs 75 75, mounted in a finger 76, centrally cut away to receive the inner ends of the said operating-levers and formed integral with the upper end of a slide 77, which is fitted into the hollow post 59, depending from the lower face of the table 57, the said slide being provided with a screw-stud 78, by means of which it is connected, through a vertically-elongated slot 79, with a plate 80, hinged at its lower end, the said slide and hinged plate being clamped together in any desired position of adjustment within the limits of the said slot by means of a hand-nut 81. The lower end of the said plate is hinged to a rod 82, connected at its lower end with a lever 83, pivotally mounted in the lower portion of the arm C and connected at its inner end with an upright actuating-rod 84, extending upward through the head D of the machine-frame and provided at its extreme upper end with a block 85, carrying an anti-friction roller 86, which engages with the periphery of a combined cam and clutch 87, mounted on the main shaft E. A spring 88, encircling the upper end of the said upright rod, is arranged to exert a constant tendency to force the said anti-friction roller 86 against the face of the cam, which, by depressing the said rod, operates through the same, the lever 83, the rod 82, the hinged plate 80, and the slide 77 in operating the clinchers in closing down the ends of the staples as they come through the work being stitched. The said cam is rigidly secured to the shaft E, which carries at its other end the operating-disk 48, before mentioned, and is provided with a cam-lug 89, formed upon its face, but not occupying its entire width. This lug is transversely chambered to receive a spring-actuated clutch-pin 90, one end of which is provided with a head 91, which when projected is engaged by the lugs 92 92, formed upon the driving-wheel 90, which is loosely mounted upon the shaft E. The opposite end of the said clutch-pin projects beyond the outer face of the said lug, and is provided with a groove 94, which as the cam is rotated engages with the lower end of an inclined rib 95, formed upon the inner face of a bell-crank clutch-lever 96 and arranged so that as the cam revolves it will withdraw the clutch-pin and disengage the head 91 thereof from that lug 92 on the driving-wheel with which it may be engaged. A spring 97, located in a chamber formed in the cam and connected with the clutch-pin by a pin 98, is provided for actuating the clutch-pin in the opposite direction. The said bell-crank lever is hung from the head D on a stud 99, and is connected by an operating-rod 100 with a treadle, which is not shown, the clutch-pin being released for a re-engagement with the lugs of the driving-wheel by depressing the treadle, whereby the clutch-lever is entirely withdrawn from engagement with the grooved end of the said pin. It will thus be seen that the said cam has the twofold function of a cam and a clutch, in one case operating the staple-clinching mechanism and in the second case controlling the starting and stopping of the mechanism for feeding, cutting off, forming, and driving the staples.

It has already been explained that the opposite side of the machine duplicates in its mechanism the side just described, with the exception of its stitching-table, which will now be described. This table 101 is composed of a single leaf having a square inner edge and is narrower than the flat stitching-table before described, and is hinged by its inner edge to a hollow post 102, made vertically adjustable in the arm C' of the machine-frame and provided at its upper end with a horizontal V-shaped head 103, which is normally fitted into a slot 104, formed in the inner edge of the table and midway of the length thereof, the said head being provided in its upper end with an elongated slot 104, which receives the staple-clinchers of this side of the machine. This table is supported in a horizontal position, in which it may be used like any ordinary flat stitching-table by means of an arm 106, hinged to its lower face and provided at its lower end with a locking-slot 107, receiving a locking-stud 108, projecting outwardly from the hollow post 102 of the said V-shaped head. When it is desired to support the table in its horizontal position, the said arm is operated so as to bring the locking-stud into the offsetting lower end of its locking-slot. In this position of the table a gage is necessary. This consists of a heavy bar 109, bent to form an offset midway of its length and provided with two heavy wire fingers 110 110, the free ends of which enter horizontal openings 111, formed in the inner edge of the table. When the table is used in its horizontal position, the horizontal V-shaped head, before mentioned, is virtually retired; but when the table is dropped down into an inclined position by throwing its supporting-arm inward, so as to clear the offsetting lower end of its locking-slot from the locking-stud, the upper inner edge of the table is brought into alignment with the V-shaped head, which co-operates with it in forming a perfect table for saddle-stitching, which is done upon the said edge of the table and upon the upper or pointed edge of the V-shaped head.

Having described in detail the construction of our improved machine, we will now proceed to set forth the mode of its operation in flat-wire stitching.

The wire, having been straightened and fed forward through the feeding and through the cutting-off mechanism, enters the conical centering-recess 20, partly formed in the former 8 and partly formed in the face-plate 7, the former being at this time in position to bring its half of the said centering-recess in alignment with the half of the same located in the face-plate. From the said centering-recess 20 the wire enters one end of the horizontal groove 21, formed in the face-plate, and passes therefrom into the corresponding groove 22, formed in the inner face of the anvil 13, and thence through into the other portion of the groove 21, formed in the face-plate. After the wire has been fed, as described, the driver 9, which is at this time in contact with the anvil 13, makes its downstroke to drive the staple previously formed. This done, the driver makes its upstroke and is carried above the anvil, which is now thrown inward by the action of the spring 19 under the outer edge of the lower end of the former 8, so as to bring the length of wire carried by the anvil in alignment with the flaring and enlarged lower ends of the forming-grooves 28 29, the same operation of the anvil also bringing the wire in alignment with the shoulder 30 of the driver, which is now at or near the limit of its upstroke. The former 8 now descends, and the staple-blank being held stationary by the anvil, the ends of the blank are thrown downward into the beveled clearance-slots 37 37 in the presser-foot. The former continuing to descend below the anvil, the ends of the wire are drawn entirely into the forming-grooves and into alignment with the driving-grooves 44 44 in the presser-foot. The further descent of the former having now closed the opening required between the lower end thereof and the the upper edge of the presser-foot to permit the ends of the staple-blank to clear the presser-foot and enter the forming-grooves 28 28 in the former, the driver descends and engages the bevel 26, formed at its lower end with the bevel 27, formed upon the inner face of the anvil 13, and forces the latter outward against the tension of the spring 19, and thus entirely disengages the anvil from the staple which has just been formed, leaving the crown of the said staple directly in alignment with the driver, which further engages with the said crown of the staple and forces the staple down through the former and enters its ends into the aligned driving-grooves 44 44 in the presser-foot, which has been positively stopped against further depression by the engagement of the screw-stud 33, carried by it, with the lower end wall of the vertically-elongated slot 35, formed in the casing F. As the driver descends, it engages the crown of the staple with the curved operating-face 42 of the supporting-block 12, the spring 40 whereof holds the said operating-face of the block against the crown of the staple with sufficient force to keep the said crown in its position in the shoulder 30 of the driver 9, the ends of the staple being meanwhile kept spread apart in the driving-grooves 44 by the supporting-block, which is gradually retired and thrown outward by the action of the driver on its curved operating-face, the supporting-block swinging on its pivot as it is retired.

It may be here remarked that the operating-face of the supporting-block being concave it extends entirely under the crown of the staple and supports the same more completely than do the movable inclined supporters heretofore used for supporting the staple and only engaging with the outer corner thereof.

By pivoting our improved supporting-block in the outer edge of the upper end of the presser-foot the leverage obtained between the block and the driver is such that the latter is enabled to retire the block and force it out of the way, notwithstanding the fact that the spring of the block is made sufficiently stiff to hold the crown of the staple very firmly against the driver. It will be observed, also, that at the beginning of the operation of driving a staple, when the ends are first entered into the work, at which time it is more necessary than any other to firmly support the staple, the operating-face of the supporting-block is in position to better support the crown of the staple than in its subsequent positions, when it grows more and more inclined in its relation to the crown of the staple. It will thus be seen that our improved supporting-block is of the highest efficiency at the very time when the best support of the staple is required.

As before explained, the supporting-block is gradually retired as the driver descends, and finally is entirely cleared from the lower end of the driver, which then presses the crown of the staple upon the work. The driver is now caused to ascend, permitting the supporting-block to be restored by its spring 40 to its normal position, and passing above the anvil, which has meanwhile received a new staple-blank, and which, as the driver is lifted above it, is thrown under the former, which then comes down and forms the staple. The opening between its lower end and the presser-foot is again closed, and the driver descends again to drive the staple just formed, as above described. It will thus be seen that when one staple is being driven the machine is feeding and cutting off the wire preparatory to forming another.

Particular attention is directed to our feature of closing the space between the lower end of the former and the presser-foot, whereby no chance is given for the ends of the formed staples to spring out of place as they are driven down into the driving-grooves in the presser-foot. A frequent source of clogging in this class of machines is thus entirely avoided. In prior machines, so far as we are aware, the clearance-opening provided for the folding of the ends of the staple has never been closed.

When the ends of the driven staple pass through on the opposite side of the work, they engage with the operating ends of the clinchers, which are now in their inclined positions, whereby the said ends of the staples are drawn inward. Then, just before the machine completes its revolution, the combined clutch and cam operates to depress the upright actuating-rod, and so operate the clinchers in clinching the ends of the staple. The clinching mechanism, being of positive operation and powerful leverage, reliably performs this part of the work.

In prior machines of this class the stitching-tables have been vertically adjusted by bodily moving their supports; but under our construction the table is movably mounted in the upper end of its supporting-arm. This necessitates provision for adjusting the coupling between the clinchers and their power-connections, and is provided for by the vertically-slotted hinge-plate and the hand-nut, which is always loosened preparatory to adjusting the table, and tightened after the table has been adjusted, the vertical slide 77, with which the hand-nut 81 is connected, having been dropped down before the hand-nut is tightened into position for bringing the clinchers into their inclined operating positions.

It will be understood that the operation of the other side of the machine is in every respect identical with the operation above described, except in regard to the table, which is shifted from its horizontal to its inclined position, as may be desired, to do flat or saddle stitching.

Figure 27:
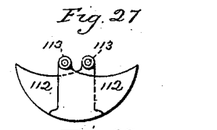
Fig. 27, a detail view, in side elevation, of a modified construction, which we may employ in place of the supporting-block.
Figure 28:
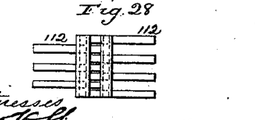
Fig. 28, a plan view of such modified construction.

Figs. 27 and 28 of the drawings show a modified construction to be used in lieu of the supporting-block elsewhere shown and described. This construction consists in two comb-like supporting-blocks 112 112, mounted on pivots 113 113 and arranged to be retired in opposite directions by the driver, which comes down between them. When these two supporting-blocks are employed, they will support the wire laterally in both directions and avoid the necessity of shouldering the lower end of the driver to receive the wire and support it against lateral displacement in one direction.

Having fully described our invention, what we claim as new, and desire to secure by Letters Patent, is—

1. In a staple-stitching machine, the combination, with the standard thereof, of independent flat and round wire stitching mechanisms located opposite each other in the same horizontal plane, substantially as described, and independent power-connections for the said mechanisms located between the same and mounted in the standard, whereby either flat or round wire stitching may be done on the machine without interchanging or removing any of its parts, substantially as described.

2. In a staple-stitching machine, the combination, with a flat-wire-stitching mechanism and a round-wire-stitching mechanism, of two stitching-tables respectively located opposite each other, and power-connections located between the said mechanisms, whereby two persons may work at the machine at the same time without interfering with each other, substantially as described.

3. In a staple-stitching machine, the combination, with an upright post, of two curved table-supporting arms extending in opposite directions therefrom, and a flat-wire-stitching and a round-wire-stitching mechanism supported by the upper end of the post over the said arms in cases connected with the post, substantially as described.

4. In a staple-stitching machine, the combination of a hollow upright post having two curved table-supporting arms extending in opposite directions therefrom, a circular head located at the upper end of the post and receiving two driving-pulleys and affording bearing for two shafts, two cases respectively located at opposite points of the said head, a round-wire-stitching mechanism and a flat-wire-stitching mechanism respectively located within the said cases, and two tables respectively located under the cases and supported by the said arms, substantially as described.

5. In a staple-stitching machine, a wire-straightening device composed of a frame having an opening formed in it for the wire to pass through and another opening to free the wire between the ends of the wire-receiving opening, a longitudinally-movable straightening-block located within the said frame and provided with a groove through which the wire passes, a spiral spring located within the frame for moving the said block in one direction, and a screw also located in the frame and engaging with the block for moving it in the opposite direction and provided with a head having a graduated scale engraved upon it for enabling it to be rightly set in gaging the position of the block with reference to the opening formed in the frame for the wire, substantially as described.

6. In a staple-stitching machine, the combination, with a reciprocating feed-block, of a swinging frame secured thereto, a toothed feed-wheel journaled in the lower end of the said frame, a check-cam mounted in the upper end of the frame for engagement with the said wheel, and a wire-supporting guide-block also mounted in the reciprocating feed-block and located below the wheel, substantially as described.

7. In a staple-stitching machine, a wire-supporting guide-block longitudinally grooved and provided with two or more transverse guideways for the wire, so that after one guideway has become worn the block may be shifted to bring another into use, substantially as described.

8. In a staple-stitching machine, a cutting-off mechanism consisting of a cutter-box provided with an elongated horizontal slot receiving a thumb-nut, by which it is clamped to the frame of the machine, in combination with a longitudinally-slotted adjustable die mounted in the lower end of the said box, and a finger secured to the box and entering the slot in the die, which it holds in place and also retains the wire in the bottom of the slot thereof, substantially as described.

9. In a staple-stitching machine, the combination, with a vertically-movable part of the staple forming and driving mechanism, of a rocking arm adapted to be engaged with the said part to be actuated thereby, and a cutter connected with the said arm for actuation, substantially as described.

10. In a staple-stitching machine, the combination, with a vertically-reciprocating part of the staple forming and driving mechanism, of a rocking arm connected with said parts so as to be actuated thereby, and a cutter connected with the said arm so as to be horizontally movable independently thereof for adjustment to cut the staple-blanks of different lengths, substantially as described.

11. In a staple-stitching machine, the combination, with a vertically-moving part of the staple forming and driving mechanism, of a rocking arm adapted to be actuated by the said part and having a horizontal cog-like end, and a cutter adapted to be engaged with said end of the arm so as to be horizontally movable thereupon in adjusting the machine to cut staple-blanks of different lengths, substantially as described.

12. In a staple-stitching machine, the combination, with a staple-driver, of an anvil moving on a pivot and provided with an inclined face for engagement by the driver, so as to be displaced thereby when the same descends to drive the formed staple, substantially as described.

13. In a staple-stitching machine, the combination, with the staple-driver having its lower end beveled, of an anvil hung on a pivot and provided with a bevel or incline to co-operate with that of the staple-driver, which operates to retire the anvil preparatory to driving a formed staple, substantially as described.

14. In a staple-stitching machine, the combination, with an anvil provided with a horizontal groove to receive the wire, of one or more retaining-wires extending transversely across the said groove to hold the staple-wire in place therein when the staple-driver of the machine is lifted above the anvil, substantially as described.

15. In a staple-stitching machine, the combination, with an anvil provided with a horizontal groove to receive the staple-wire, of one or more retaining-wires extending transversely across the said groove and stationarily secured to the frame of the machine, and a staple-driver provided with one or more vertical grooves to receive the said retaining-wires which hold the staple-wire in the horizontal groove in the anvil when the staple-driver is raised above the said anvil, substantially as described.

16. In a staple-stitching machine, the combination, with a former, of a presser-foot movably connected with the lower end thereof so as to provide for a clearance-space for folding the ends of the staple-blanks and for closing the said space to prevent the displacement of the ends of the staple when being driven, substantially as described.

17. In a staple-stitching machine, the combination, with a former, of a presser-foot movably connected with the lower end thereof, and connection between the said foot and the frame of the machine, whereby the foot is arrested at a predetermined point in the downward movement of the former, substantially as described.

18. In a staple-stitching machine, the combination, with a former, of a presser-foot connected with the lower end thereof so as to be movable relatively thereto, a spring combined with the former and presser-foot so as to normally force them apart and secure a clearance-space between them, and a stop for limiting the movement between the said parts, substantially as described.

19. In a staple-stitching machine, the combination, with the driver thereof, of a supporting-block pivoted at its upper end and having an operating-face extending virtually at a right angle under the driver when the same engages with it, and a spring for holding the said block under the driver, substantially as described.

20. In a staple-stitching machine, the combination, with the driver thereof, of a presser-foot provided with driving-slots, a supporting-block pivotally hung in the forward edge of the upper end of the said foot and provided with an operating-face virtually extending at a right angle under the driver in the normal position of the block, and a spring for holding the said block in position in the foot, substantially as described.

21. In a staple-stitching machine, the combination, with a former, of a presser-foot movably connected with the lower end thereof so as to form a clearance-space which is closed when the two parts are brought together, a staple-driver playing in a groove in the former and passing downward through a chamber in the presser-foot, a supporting-block located in the said chamber in the presser-foot and hung on a pivot located in the forward edge of the upper end thereof and having an operating-face normally extending at a right angle under the said driver, and a spring for operating the said block, substantially as described.

22. In a staple-stitching machine, the combination, with a staple-driver, of a horizontal longitudinally-slotted bar with which the said driver is connected, and a cam having an eccentric stud entering the said bar, whereby the bar and staple-driver are vertically reciprocated, substantially as described.

23. In a staple-stitching machine, the combination, with the frame thereof provided with a table-supporting arm, of a table provided upon its lower face with a hollow post which is adapted to be entered into the upper end of the said supporting-arm, and adjusting and clamping connections connected with the said arm and post for varying the elevation of the table, substantially as described.

24. In a staple-stitching machine, the combination, with a table-supporting arm thereof, of a table provided upon its under face with a hollow post, a stud or pin mounted in the said post and extending through a slot in the arm, an adjusting-lever provided at its upper end with a cam-slot receiving the said stud, and a clamping-cap located upon the threaded outer end of the stud for clamping the adjusting-lever and the post to the arm, substantially as described.

25. In a staple-stitching machine, the combination, with two pivotal clinchers, of two operating-levers, links connecting the outer end of the said clinchers with the outer ends of the said levers, a vertically-movable slide having the operating-levers connected with its upper end, and power-connections for the said slide, substantially as described.

26. In a staple-stitching machine, the combination of two clinchers, a vertically-movable slide connected with them, and an adjustable coupling between the said slide and the power-connections by which the same is operated, substantially as described.

27. In a staple-stitching machine, the combination, with a hollow table-supporting arm, of a stitching-table provided on its under face with a hollow post adapted to fit into the upper end of the said arm, means for adjusting the said table and clamping it in any desired position of elevation, two clinchers, a vertically-movable slide located within the hollow post and connected with the said clinchers, and an adjustable coupling between the said slide and the power-connections for operating the same, substantially as described.

28. In a staple-stitching machine, the combination, with mechanism for feeding and cutting off the staple-wire and forming and driving the staple, of clinching mechanism for turning over and clinching the ends of the driven staples, and a combined clutch and cam operating as a clutch to start the feeding, cutting-off, forming, and driving mechanisms and as a cam to operate the clinching mechanism, substantially as described.

29. In a staple-stitching machine, a combined clutch and cam having upon its periphery a cam-lug, a clutch-pin located in a chamber formed in the said lug, a spring for throwing the said pin into its operative position, a clutch-lever provided with an inclined rib and arranged to engage with the pin, so as to retract it from its operative position, and means engaged by the said cam-lug for transmitting the movement of the cam to the clinching mechanism of the machine, substantially as described.

30. In a staple-stitching machine, the combination, with a stitching-table composed of a single leaf having a square inner edge which is slotted, of a head located in the slot in the table and carrying the clinchers, and means, substantially as described, for supporting the table in a horizontal or inclined position, substantially as described.

31. In a staple-stitching machine, the combination, with a stitching-table pivoted to or near its rear edge in a horizontal plane, of a V-shaped head let into a slot formed in the rear edge of the said table, and means for supporting the table in a horizontal position, substantially as described.

32. In a staple-stitching machine, the combination of a table pivotally hung in a horizontal plane at or near its inner edge and a slotted supporting-arm for holding the table in its horizontal position, in which it is used for flat stitching, and to release the table to permit its rear edge to be presented for use in saddle-stitching, substantially as described.

33. In a saddle-stitching machine, the combination, with a central upright forming a part of the machine-frame, of a curved arm attached to the said upright and curved upward and supporting the stitching-table, of a horizontal stay extending between the upright and the said arm for resisting the strain imposed upon the table in heavy stitching, substantially as described.

34. In a staple-stitching machine having its staple-wire-feeding mechanism, its cutting-off mechanism, and its stitching-table-adjusting mechanism provided with corresponding graduations, whereby all of the said mechanisms may be adjusted without experiment for stitching books of any thickness within the capacity of the machine, substantially as described.

35. In a staple-stitching machine, the combination, with two feed-wheels, of a reciprocating feed-block, by means of which one of the said wheels is carried, and a check-cam for each wheel, the said wheels being arranged to rotate freely in one direction and to alternately grip the wire, acccording to the direction in which the feed-block is moving, whereby the wheels roll lightly over the wire when they do not grip the same, tripping their check-cams, substantially as described.

36. In a staple-stitching machine, the combination, with two pivotal frames, of a reciprocating feed-block to which one of the said frames is secured, a toothed feed-wheel mounted in the lower end of each frame, a check-cam for each wheel, and means for supporting the wire below the wheels, which are alternately locked by their cams to grip the wire, which they otherwise roll lightly over, tripping their check-cams without scraping the wire, their pivotal frames permitting them to be lifted away slightly from it, substantially as described.

37. In a staple-stitching machine, the combination, with the standard thereof, of independent flat and round wire stitching mechanism located opposite each other in the same horizontal plane, substantially as described, an independent stitching-table for each mechanism, and independent power-connections for the respective mechanisms, including two independent driving-shafts, located in line in the same horizontal plane and each carrying a driving-pulley, whereby either flat or round wire stitching may be done on the machine without interchanging or removing any of its parts, substantially as described.

38. In a staple-stitching machine, the combination, with the standard thereof having a circular head at its upper end, of independent flat and round wire stitching mechanisms located opposite each other and on the outside of the said head, and power-connections, including two driving-shafts, located in the same line within the said head and each carrying a driving-pulley and clutching mechanism, substantially as described.

FRANK S. BRADLEY.
JOSEPH P. LAVIGNE.

Witnesses:
GEO. D. SEYMOUR,
FRED C. EARLE.